July 23, 1968 W. F. BUCHELE 3,393,874
MATERIAL-HANDLING APPARATUS
Filed Feb. 27, 1967 3 Sheets-Sheet 1

INVENTOR
WESLEY F. BUCHELE
BY
Rudolph L. Lowell
ATTORNEY

July 23, 1968 W. F. BUCHELE 3,393,874
MATERIAL-HANDLING APPARATUS
Filed Feb. 27, 1967 3 Sheets-Sheet 2
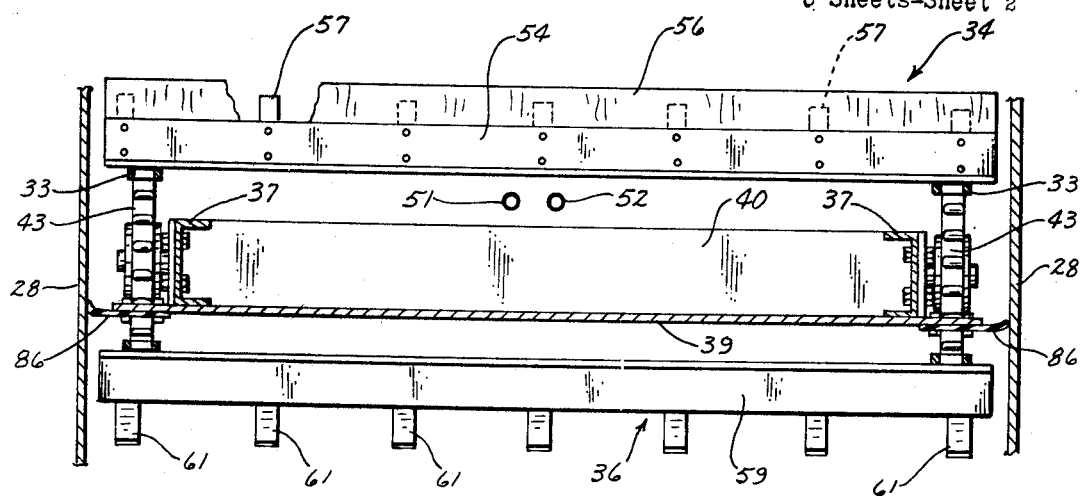
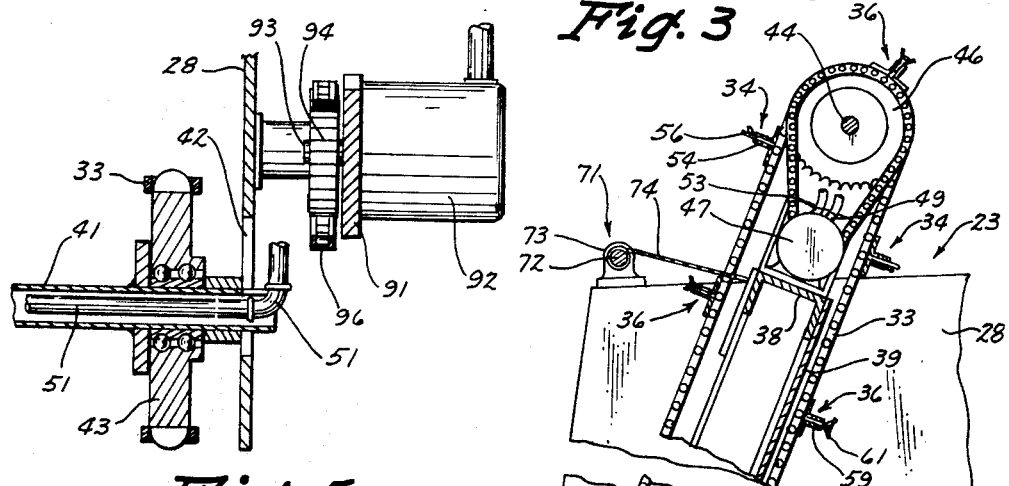
Fig. 5
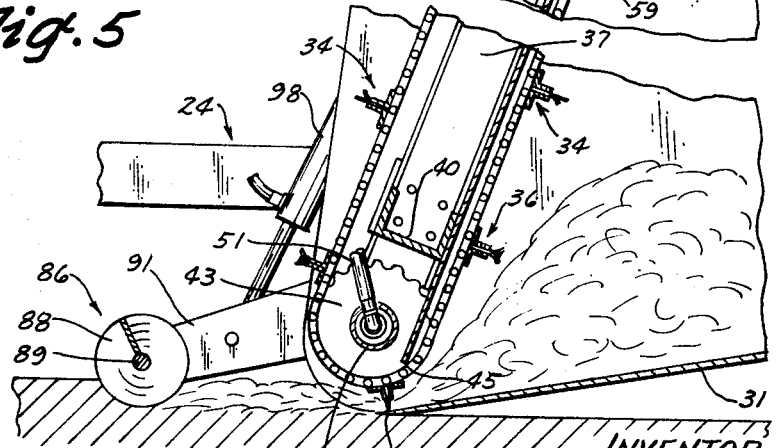
Fig. 4
INVENTOR
WESLEY F. BUCHELE
BY
Rudolph L. Rowell
ATTORNEY July 23, 1968 W. F. BUCHELE 3,393,874
MATERIAL-HANDLING APPARATUS
Filed Feb. 27, 1967 3 Sheets-Sheet 3
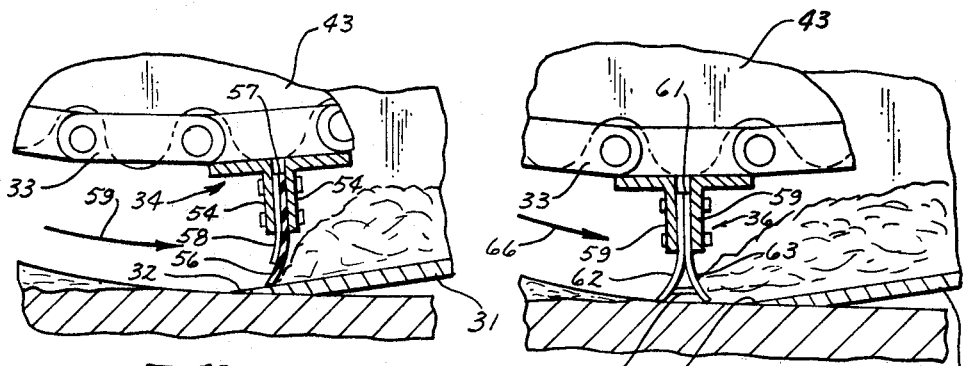
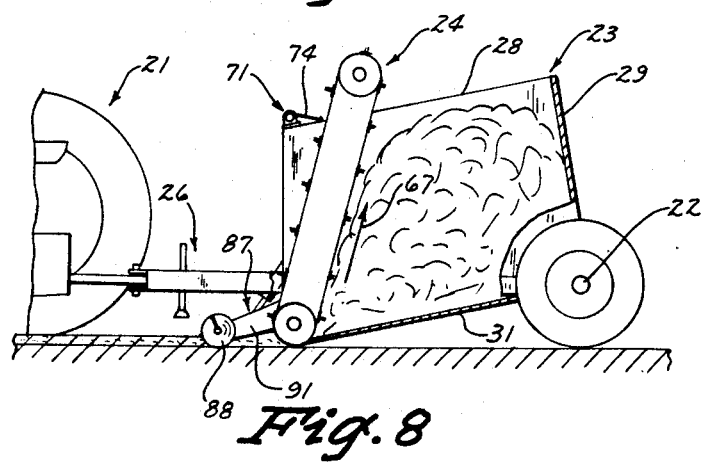
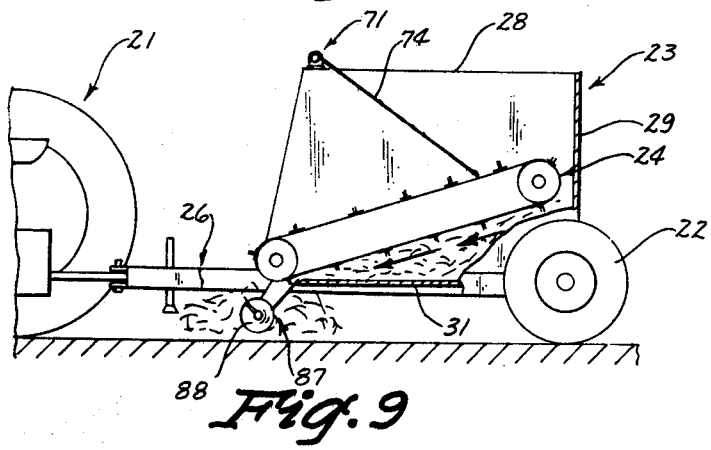
INVENTOR
WESLEY F. BUCHELE
BY
ATTORNEY United States Patent Office 3,393,874
Patented July 23, 1968

3,393,874
MATERIAL-HANDLING APPARATUS
Wesley F. Buchele, Ames, Iowa, assignor to Iowa State University Research Foundation, Inc., Ames, Iowa, a corporation of Iowa
Filed Feb. 27, 1967, Ser. No. 618,809
7 Claims. (Cl. 239—651)

ABSTRACT OF THE DISCLOSURE

A combination spreader and loader apparatus for handling fertilizer has a box open at the front end and tiltable for movement to a horizontally extended unloading position and to a forwardly tilted loading position wherein the front edge of the box bottom wall is engageable with the ground surface. An endless and reversibly operated upright conveyer means, pivotally supported at the front end of the box, has material engaging members thereon movable closely adjacent to the bottom wall. With the conveyer operated in one direction and in an upright position to close the box front end, and with the box in the loading position, material scraped up by the front edge of the bottom wall is loaded into the box between the lower end of the conveyer and the bottom wall. When the box is in an unloading position and the conveyer means is reversely operated and pivoted rearwardly into the box against the material therein, the material is unloaded between the lower end of the conveyer means and the box bottom wall. The conveyer means has flexible side portions and flexible material engaging members for wiping engagement with the box side walls and bottom wall, respectively, to hold the material in the box.

Background of the invention

Fertilizer spreaders now in general use are loaded by hand but more commonly are loaded by tractor mounted loader or scoop attachments. Unless two tractors are available, one for pulling the spreader and one for loading the spreader, it is necessary to use a single tractor for both operations. In this event, the loader attachment remains mounted on the tractor. However each time the spreader is to be loaded it must first be maneuvered to a loading position after which the tractor is disconnected therefrom for operation and manipulation of the loader attachment. When the spreader is loaded it is again connected to the tractor for hauling to the field. Along with the connecting and disconnecting of the tractor for loading purposes, the operator must put up with the further inconvenience of operating and transporting the spreader with the loader attachment always on the tractor.

Summary of the invention

The present invention provides a combination spreader and loader apparatus capable of handling solid manure and the liquids thereof. The apparatus is hydraulically operated, tractor towed and readily operable by the tractor operator through hydraulic control valves that may be installed on the tractor for convenient manipulation by the tractor operator.

The material handling apparatus of this invention eliminates the need for separate loading equipment such as a tractor loader attachment. Additionally, the tractor remains connected to the apparatus at all times so that the tractor operator may remain on the tractor during material loading and unloading operations.

The apparatus is economical in cost and efficient in operation and provides for the loading of the box in a short period of time and with a minimum of effort by the tractor operator.

Detailed description of the invention

The advantages and features of the invention will become apparent from the following detailed description when taken in connection with the accompanying drawings in which:

FIG. 3 is an enlarged sectional view taken on the line of 3—3 of FIG. 2;

FIG. 4 is a sectional view as seen on the line 4—4 in FIG. 2;

FIG. 5 is an enlarged sectional view taken along the line 5—5 in FIG. 2;

FIG. 6 is an enlarged showing of the lower end of the conveyer assembly in FIG. 4 illustrating the wiping action of one of the material engaging units thereon with the bottom wall of the box;

FIG. 7 is illustrated similarly to FIG. 6 and shows another material engaging unit of the conveyer assembly in wiping engagement with the bottom wall of the box;

FIG. 8 is a diagrammatic illustration of the apparatus showing the relative arrangement of the parts thereof when material is to be loaded into the box; and FIG. 9 is illustrated similarly to FIG. 8 and shows the relative arrangement of the parts of the apparatus for unloading material from the box.

Figure 1:
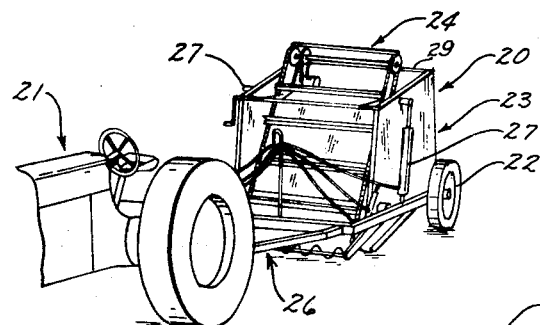
FIG. 1 is a front perspective view of the material handling apparatus illustrated in a towed relation with a farm tractor.

Referring to FIG. 1 of the drawings, the material handling apparatus of this invention, indicated generally at 20, is illustrated in a towed relation with a usual farm tractor 21 equipped with a hydraulic system that includes an oil pump and reservoir unit (not shown). The apparatus 20 comprises a wheel and axle unit 22, a box 23 pivotally mounted at its rear end on the unit 22 and having an upright transversely extended conveyer or elevator assembly 24 mounted at its front end. A tongue structure 26 is pivotally mounted on the wheel and axle unit 22 with its front end adapted for connection to the tractor 21. Up and down pivotal movement of the box 23, relative to the wheel and axle unit 22, is accomplished by a pair of upright one-way acting hydraulic cylinder assemblies 27 arranged at opposite sides of the box 23, with each hydraulic cylinder assembly 27 extended between and connected to the tongue structure 26 and the upper end of the box 23. The tongue structure 26 and the wheel and axle unit 22 thus constitute a portable frame for the box 23.

The box 23 (FIG. 1) includes a pair of side walls 28, a rear wall 29 and a bottom wall or floor 31 having a front edge 32 as best shown in FIG. 4. The front end of the box 23 is open.

The conveyor assembly 24 (FIGS. 2 and 4) includes a pair of transversely spaced longitudinally running endless chains 33 cross connected by a plurality of transverse longitudinally spaced material engaging units 34 and 36 that are alternately arranged along the runs of the chains 33.

Figure 2:
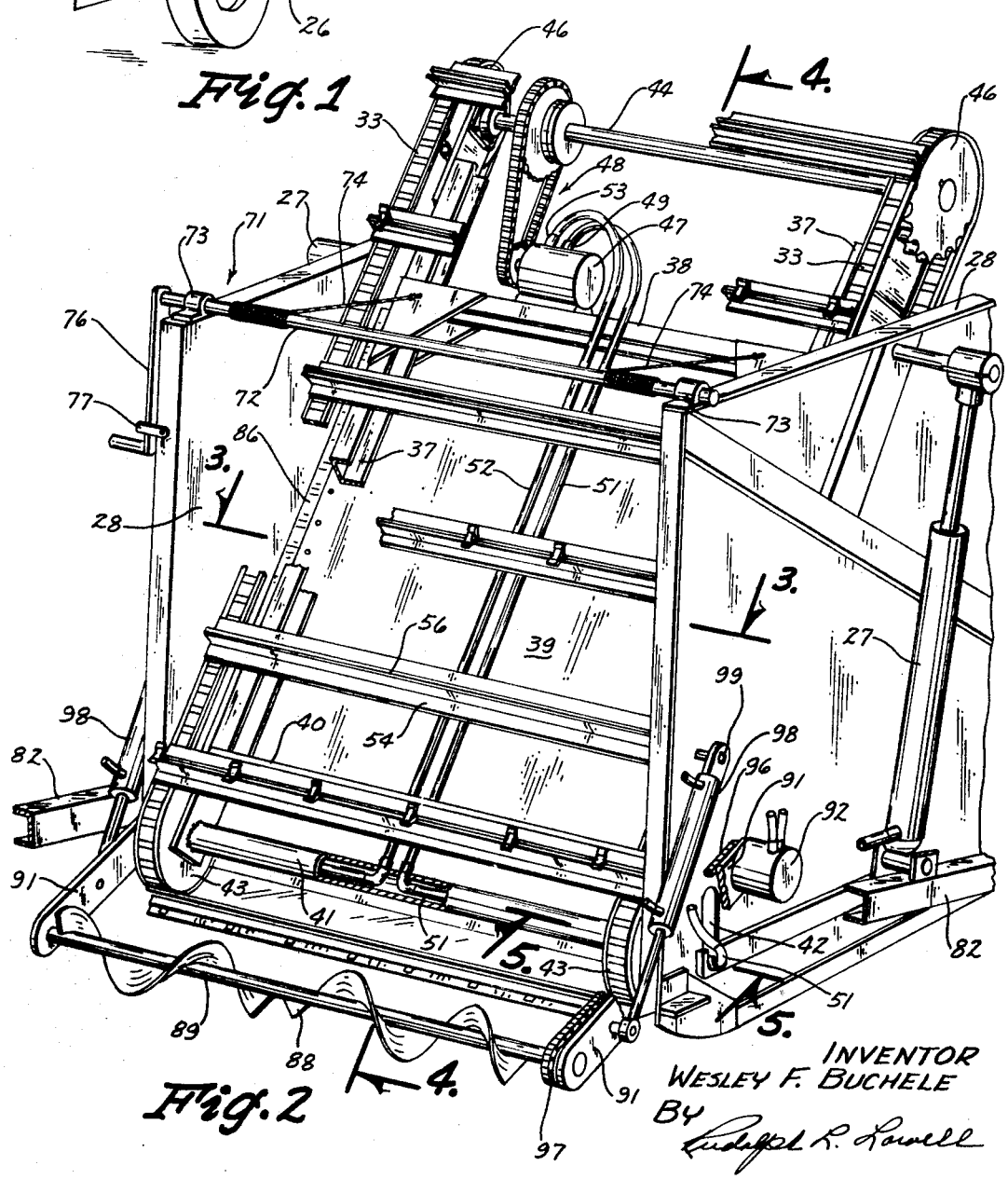
FIG. 2 is an enlarged perspective view of the front portion of the apparatus with some parts broken away and other parts shown in section to more clearly illustrate its construction.

The frame structure of the conveyer assembly 24 includes a pair of side frame members 37 that are connected together by an upper and lower transverse frame member 38 and 40, respectively, as shown in FIG. 2. The side frame members 37, when the conveyer assembly 24 is in an upright position at the front end of the box 23, project upwardly from the top of the box with the frame member 38 substantially at the level of the top of the box. A back plate member 39 is connected to the rear surfaces of the transverse frame members 38 and 40 with its lower end 45 (FIG. 4) terminating adjacent the bottom wall 31 of the box 23. With the side frame members 37 located adjacent the inner surfaces of corresponding side walls 28 of the box it is seen that the plate member 39 (FIG. 3) constitutes a closure for the front end of the box when the conveyer assembly 24 is in an upright position.

Secured to the lower ends of the side frame members 37 is a hollow or tubular shaft 41 (FIG. 2) the opposite ends of which project outwardly through upright slots 42 formed in the box sidewalls 28 at the lower front ends thereof. A pair of idler sprockets 43 are rotatably supported on the shaft 41, each at a position between a corresponding side wall 28 and side frame member 37.

Extended between and rotatably supported in the upper ends of the side frame members 37 is a drive shaft 44 (FIG. 2) which carries a pair of drive sprockets 46 for the chains 33. The idler sprockets 43 and the drive sprockets 46 are of a size to provide for the rear runs or lengths of the chains 33 moving along the rear side of the back plate 39, with their front runs moving adjacent and to one side of the front surfaces of the side frame members 37.

Mounted on the upper frame member 38 is a reversible hydraulic motor 47 which is connected in a driving relation with the shaft 44 by a sprocket and chain assembly indicated at 48. The inlet 49 of the motor 47 is connected to a fluid conduit 51 that extends along the front side of plate 39 and into the hollow shaft 41 for projection from an end thereof to provide for its connection with the hydraulic system of the tractor. In like manner a fluid conduit 52, connected to the motor outlet 53 is extended along the front side of the plate member 39 and into the hollow shaft 41 to project outwardly from the opposite end thereof for connection with the hydraulic system of the tractor.

Referring to FIGS. 4 and 6, each material engaging unit 34 is illustrated as comprised of a pair of angle members secured to the chains 33 with their legs 54 projected outwardly from the chains and spaced a distance apart to receive therebetween a flat flexible or squeegee member 56 and a plurality of transversely spaced material engaging fingers 57. The flexible member 56 projects outwardly from between the angle member legs 54 for wiping engagement with the bottom wall 31 at a position adjacent to its front edge 32. A finger 57 has a curved section 58 projected outwardly from between the angle member legs 54 a lesser distance than the flexible member 56. The curvature of the finger section 58 is in a forward direction when the material engaging unit 34 is projected downwardly from the lower end of the conveyer assembly 24.

Thus when the chains 33 are at the lower end of the conveyer assembly 24 and moving in the direction indicated by the arrow 59, as shown in FIG. 6, namely, in a direction toward the rear end of the box 23, the curved sections 58 of the fingers 57 constitute back supports for the flexible member 56. For a reverse travel of the chains 33 this back support function of the finger sections 58 is eliminated so that the fingers 57 are directly engageable with the material being handled.

As shown in FIGS. 4 and 7 each material engaging unit 36 includes a pair of angle members secured to the chains 33 with their legs 59 projected outwardly and spaced apart to receive therebetween a plurality of transversely spaced fingers 61. Each finger 61 has a pair of reversely curved sections 62 and 63 projected outwardly from the angle member legs 59 for movement closely adjacent the box bottom wall 31. A brace member 64 is connected to and extended between the curved sections 62 and 63. Thus when the chains 33 are moving in the direction indicated by the arrow 66 in FIG. 7, the curved section 63 is engageable with the material being handled. On movement of the chains 33 in a reverse direction the material is engaged by the curved section 62.

Assume the use of the apparatus 20 for loading the box 23. As shown in FIG. 8 the conveyer assembly 24 is in an upright position at the front end of the box and the motor 47 is operated to move the chains 33 in the direction indicated by the arrow 67. The conveyer 24 is moved to an upright position by a usual hand operated winch mechanism 71 (FIG. 2) which includes a winding shaft 72 rotatably supported in bearings 73 at the front upper ends of the box side walls 28. Cables 74 windable on the shaft 72 are connected to the conveyer assembly 24 at the upper frame member 38. The shaft 72 is rotated by a hand crank 76 which is engageable with a latch 77 to lock the shaft 72 against unwinding the cables 74.

The box 23 (FIGS. 4 and 8) through operation of the hydraulic cylinder assemblies 27, is pivoted to lower the front edge 32 of the bottom wall 31 in scraping engagement with the ground surface. The front end of the bottom wall 31 thus functions as a scraper. This lowered position of the scraping edge 32 is limited by ground engaging runners 77 (FIG. 2) one of which is provided at each of the lower front corners of the box side walls 28. On a forward advance of the apparatus 20, as shown in FIG. 8, fertilizer material on the ground surface is picked up by the scraper action of the front end of the box bottom wall 31 and is moved by the material engaging units 34 and 36 into the box 23 for accumulation therein. With the pivot shaft 41 at the lower end of the conveyer assembly 24 extended through the upright slots 42 in the side walls 28, the conveyer assembly 24 is movable upwardly relative to the box bottom wall 31 to accommodate variations in the size of the material being handled. The clearance relation of the lower end of the conveyer assembly 24 with the box bottom wall 31 is thus automatically adjusted to provide for the loading and unloading of material of variable bulk or size.

By virtue of the squeegee action of the flexible members 56 on the material engaging units 34, relative to the bottom wall 31, and the material engaging action of the curved sections 63 of the fingers 61 on the material engaging units 36 both solid and liquid manure are capable of being loaded into the box 23. When the box is loaded the hydraulic cylinder assemblies 27 are operated to tilt the front end of the box to its position shown in FIG. 9 for transport purposes.

As shown in FIGS. 1 and 2, the tongue structure 26 includes a pair of side frame members 82 arranged in the manner of a yoke in that their rear ends are spaced for free rotatable support on the wheel and axle unit 22 on each side of the box 23. The front ends of the side frame members 82, forwardly of the box 23, are bent inwardly toward each other and connected together for attachment to the tractor 21. Pivotal movement of the box 23 thus takes place between the side frame members 82 in response to the actuation of the hydraulic cylinder assemblies 27.

When material is to be unloaded from the box 23 the box is retained in its transport position shown in FIG. 9 and the hydraulic motor 47 is operated to reverse the direction of movement of the chains 33, as indicated by the arrows 83, relative to their movement for loading shown in FIG. 8.

The winch mechanism 71 is then released so that the conveyor assembly 24 is permitted to pivot rearwardly into the box 23 and against the material therein. As a result of the reversed operation or movement of the chains 33 the curved sections 58 and 62 on the material engaging units 34 and 36, respectively, in conjunction with their supporting angle members move the material downwardly and forwardly for discharge from the box at a position between the lower end of the conveyer assembly 24 and the front end 32 of the box bottom wall 31. Progressively with the removal of material from the box the conveyer assembly 24 is progressively pivoted rearwardly against the material to a final position within and extended longitudinally of the box 23.

During transport it is desirable that a material engaging unit 34 be positioned at the lower end of the conveyer assembly 24 with the squeegee member 56 in wiping engagement with the bottom wall 31 as shown in FIG. 6 to prevent material from dropping out of the box. Likewise, it is desirable that the side portions of the plate member 39, as best appears in FIGS. 2 and 3, be provided with flexible members 86 adapted for wiping engagement with the inner surfaces of the box side walls 28.

To facilitate the distribution of the material discharged from the box 23 over the path of travel of the apparatus 20, there is provided a distributing auger mechanism 87 which includes an auger 88 having a shaft 89 rotatably supported in the free ends of pivoted arms 91 arranged to the outside of and pivoted on the box side walls 28 (FIG. 2).

The shaft 89 is driven by a hydraulic motor 92 (FIGS. 2 and 5) mounted on one of the side walls 28 (FIG. 5) with its drive shaft 93 in axial alignment with the pivots for the arms 91. A drive sprocket 94 on the motor drive shaft 93 is connected through a sprocket chain 96 with a driven sprocket 97 mounted on the auger shaft 89 as best appears in FIG. 2.

A pair of double acting hydraulic cylinder assemblies 98 pivotally supported at 99 at positions to the outside of the box side walls 28 are connected to the pivot arms 91 to raise and lower the auger 88 relative to the front end 32 of the box bottom wall 31.

As shown in FIG. 9, material moved by the conveyor assembly 24 off of the bottom wall 31 is directed on to the distributing auger 88 for distribution. Also as illustrated in FIGS. 4 and 8, the auger 88, during a loading operation, may be adjusted into engagement with the ground surface forwardly of the scraping edge 32 to loosen and direct the material for easier pickup by the front end of the bottom wall 31.

The operation of the hydraulic cylinder assemblies 27 and 98 for pivoting the box 23 and auger mechanism 87, respectively; and the operation of the oil motors 47 and 92 for driving the conveyor chains 33 and auger 88, also respectively, is controlled by valves (not shown) mounted on the tractor 21 and connected in the usual hydraulic system of the tractor.

Although the material handling apparatus of this invention has been described with respect to a preferred embodiment thereof, it is to be understood that it is not to be so limited, since changes and modifications can be made therein within the full intended scope of the invention as defined in the appended claims.

I claim:

1. A combined spreader and loader apparatus including:
   (a) a box having a bottom wall with a front edge, side walls and an open front end,
   (b) a wheel and axle unit,
   (c) means pivotally supporting the rear end of the box on the wheel and axle unit for up and down movement of said front end,
   (d) an upright endless end reversibly operated conveyer assembly at the front end of the box located between said side walls with the lower end thereof adjacent the front edge of said bottom wall, and
   (e) pivot means supporting the conveyer assembly at the lower end thereof on the side walls for pivotal movement from a first position for closing said front end to a second position within and extended longitudinally of the box,
   (f) said conveyer assembly, when the box is in a substantially horizontal position and the apparatus is moved forwardly, being progressively movable from the first position to the second position therefor into engagement with material in the box to discharge said material to the ground from between said bottom wall and the lower end of the conveyer assembly, and said conveyer assembly when in the first position therefor and with the box tilted to bring the front edge of the bottom wall into scraping engagement with the ground surface acting to move material into the box between the lower end thereof and the bottom wall.

2. A combined spreader and loader apparatus according to claim 1 wherein:
   (a) said conveyer assembly includes side frame members adjacent the inner surfaces of corresponding ones of said side walls, and
   (b) transverse material engaging units spaced longitudinally of the conveyer assembly and projected laterally outwardly therefrom for movement closely adjacent said bottom wall.

3. A combined spreader and loader apparatus according to claim 2 including:
   (a) a flat plate member extended between and connected to said side frame members, and
   (b) flexible side members secured to said plate and projected transversely outwardly therefrom for wiping engagement with the inner surfaces of said side walls,
   (c) with certain of said transverse material engaging units including flexible members movable in wiping engagement with the bottom wall.

4. A combined spreader and loader apparatus according to claim 1, wherein:
   (a) said conveyer assembly includes side frame members and an upper frame member connected therebetween,
   (b) said pivot means includes a hollow stationary shaft having the ends thereof supported on and extended outwardly from said walls,
   (c) a shaft extended between and rotatably supported on said side frame members at a position above said upper frame member,
   (d) a reversible oil motor means mounted on said upper frame member having an inlet and an outlet,
   (e) drive means connecting said motor means with said rotatable shaft, and
   (f) fluid conduit means connected to said inlet and outlet having portions located within said hollow shaft and extended outwardly from the ends thereof.

5. A material handling apparatus including a portable frame unit comprising:
   (a) a box having a bottom wall and open at one end,
   (b) an upright endless and reversible conveyer means,
   (c) a transverse pivot means pivotally supporting the lower end of said conveyer means at said one end of the box and adjacent said bottom wall for tilting movement from a first position for closing said one end to a second position within and extended longitudinally of the box, and
   (d) means pivoting said box on said frame unit for pivotal movement to a loading position and to an unloading position,
   (e) said conveyer means in the first position therefor and operated in one direction, when the box is in a loading position wherein the edge of the bottom wall at said one end of the box is engageable with the ground surface, acting to load material into said box between the lower end thereof and said bottom wall, and
   (f) when said box is in an unloading position, wherein said edge of the bottom wall is spaced from the ground surface, and said conveyer means is reversely operated and moved from the first position to the second position therefor acting to discharge material from the box between the lower end thereof and said bottom wall.

6. A material handling apparatus according to claim 5 including:
   (a) means supporting said transverse pivot means for up and down movement to vary the clearance relation between the lower end of said conveyer means and said bottom wall.

7. A material handling apparatus according to claim 5 including:
(a) an auger assembly extended transversely of the box at a position located outwardly from said edge of the bottom wall, and
(b) means pivotally supporting said auger assembly on the box for up and down movement relative to said edge of the bottom wall,
(c) said auger assembly in one pivotally moved position, when the box is in the loading position, acting to direct material on the ground surface for pickup by the conveyer means and in a second pivotally moved position, when the box is in an unloading position, acting to distribute material discharged thereon from the box.

References Cited

UNITED STATES PATENTS 1,125,122   1/1915   Koenig _____ 239—651

FOREIGN PATENTS 204,316   7/1959   Austria.
970,607   9/1962   Great Britain.

EVERETT W. KIRBY, *Primary Examiner*.